UNITED STATES PATENT OFFICE.

GEORGE A. SCHROTER, OF DENVER, COLORADO, AND WILLIAM C. LAUGHLIN, OF NOGALES, ARIZONA.

PROCESS OF RECOVERING COPPER FROM SOLUTION.

1,200,534.  Specification of Letters Patent.  Patented Oct. 10, 1916.

No Drawing.   Application filed April 29, 1915.   Serial No. 24,640.

*To all whom it may concern:*

Be it known that we, GEORGE A. SCHROTER, a citizen of the United States, and a resident of Denver, county of Denver, State of Colorado, and WILLIAM C. LAUGHLIN, a citizen of Nogales, county of Santa Cruz, State of Arizona, have invented certain new and useful Improvements in Processes of Recovering Copper from Solution, of which the following is a specification.

Our invention relates to the process of recovering copper from solution and its object is to recover the copper with chemicals which are cheap and readily available.

A further object of our invention is to render any iron salts in the precipitate inert in the further treatment of the precipitate.

In the leaching of copper ores to obtain the copper values, it is found that certain ores give up their values to water alone, some to acids, or a mixture of acids and water, while others require a preliminary treatment by roasting, with or without chemicals, to obtain the copper in a form suitable for treatment with the above-named solvents. When the copper value in the ore is in its soluble form, the selected solvent is placed in contact with the ore and the copper obtained in solution, usually as sulfate or chlorid.

With the copper value in solution, it is the practice to concentrate said value by precipitation of the copper as metallic copper by the use of electric current or metallic iron, or to precipitate the copper as a copper compound by the addition of certain chemicals to the solution of copper. It has been proposed heretofore to use as precipitants, on a commercial scale, calcium compounds, CaO and Ca(OH)$_2$, by the direct addition of these compounds in powder form to the water or acid solution of the copper; but, because of the excess of calcium compound required for complete precipitation when added in powdered or solid form, and the bulk and impurity of the resulting precipitate, together with the difficulty of retreating the same to obtain the copper, this means of precipitation has been declared a failure, and is not in use.

Believing the calcium compounds to be the most desirable precipitant for precipitating copper values from their solutions, because of the universal existence and cheapness of the calcium compound, we have made numerous experiments seeking a process of using the calcium compound in such a way that the disadvantages above enumerated will be overcome. We have entirely eliminated the above-named difficulties and disadvantages by the following process: After the copper has been gotten in solution by the use of any desired solvent, we precipitate it from the solution by the addition to the solution of lime hydroxid in its water solution. This precipitate is removed from the then barren solution by filtering, or other equivalent means. The copper in the precipitate is then dissolved by the addition of sulfuric acid and the pregnant copper solution is then removed by filtering, or equivalent method. This solution is pure and highly concentrated and is suitable for the manufacture of copper sulfate crystals or precipitation as metallic copper by use of electric current.

It will be noted that while CaO or Ca(OH)$_2$ added in its solid or powdered form to a solution of copper as a precipitant is not commercially satisfactory for reasons before mentioned, the use of lime water is satisfactory, it being efficient to its theoretical value and gives a precipitate of the copper value in a concentrated form. The precipitate is easy to handle mechanically and readily subject to treatment for further concentration and purification. The resultant precipitate will consist principally of copper hydrate and lime sulfate, and in some cases the precipitate will contain in addition some iron hydrate when treating certain ores in which the iron contents are more or less soluble in the original solvent. Our process was also designed so that in the cases where iron salts are dissolved from the ore by the original solvent these salts are rendered inert an do not interfere with the final recovery of the copper either electrolytically or by precipitation as copper sulfate. The precipitate is collected from the now barren solution by filtration and in the cases where it contains iron salts and it is desired to render said salts inert in the second step this may be done by drying and roasting, or calcining the collected precipitate. In the second step the addition of sulfuric acid to the precipitate causes the formation of residue of CaSO$_4$ and any iron which may have been present, and a filtrate containing copper in a very pure and highly concentrated form.

From the foregoing it will be noted that we have devised a process for recovering copper from solution by which the final copper solution is rendered pure and highly concentrated and which is easily handled and from which the copper values may be easily and completely removed in the form of copper sulfate crystals, or by precipitation, as metallic copper by the use of electric current. It will be noted also that the above desirable results are accomplished by our process with chemicals, which, as heretofore used, rendered the resultant solution or precipitate extremely difficult to reduce to the final values, and consequently has made it possible to use these cheap and readily available chemicals on a commercial scale where it has been heretofore impossible to use them successfully.

We do not intend to be limited by the specific chemicals set forth above, but intend that the appended claim shall be broad enough to cover all equivalent substances, the chemicals above given, being used merely as examples and as indicating the combination of chemicals and steps which we have found to be practicable, but not necessarily the only ones which can be used in our process with success.

Having described our invention, what we claim as new and desire to secure by Letters Patent is:—

The process of recovering copper from solution which consists in adding calcium hydroxid in solution thereto, filtering same, roasting or calcining the precipitate to render the iron inert, adding sulfuric acid to the precipitate and filtering the copper solution.

In testimony whereof, we have signed our names to this specification, in the presence of two subscribing witnesses.

GEORGE A. SCHROTER.
WILLIAM C. LAUGHLIN.